June 2, 1942.　　F. M. RAMSDELL　　2,284,768
CUTTING TOOL
Filed Sept. 19, 1941

Inventor
FREDERICK M. RAMSDELL
By Albert G. Blodgett
Attorney

Patented June 2, 1942

2,284,768

UNITED STATES PATENT OFFICE 2,284,768

CUTTING TOOL

Frederick M. Ramsdell, Worcester, Mass.

Application September 19, 1941, Serial No. 411,450

7 Claims. (Cl. 77—76)

This invention relates to cutting tools, and more particularly to the construction and arrangement of tools such as reamers, counterbores, taps and the like.

When the cutting edges of the ordinary solid reamer become dull and are re-sharpened, it will produce an under-size hole in the work piece. Consequently the useful life of such a tool is comparatively limited. This has been recognized, and numerous attempts have been made to construct a reamer with adjustable blades so that a desired size might be maintained despite repeated sharpenings. However, these prior constructions have been complicated, expensive, and difficult to adjust. Furthermore, there has been a failure to support the adjustable blades with sufficient firmness and rigidity, so that chattering of the blades has commonly occurred. Similar problems are presented in the case of counterbores, taps and other tools of like nature.

It is accordingly one object of the invention to provide an adjustable cutting tool which will be comparatively simple and inexpensive to manufacture.

It is a further object of the invention to provide a tool having cutting blades which can be adjusted very easily and quickly, the construction being such that the blades will be held very firmly and with sufficient rigidity to avoid all tendency toward chattering when the tool is in use.

With these and other objects in view, as will be apparent to those skilled in the art, the invention resides in the combination of parts set forth in the specification and covered by the claims appended hereto.

Referring to the drawing illustrating one embodiment of the invention and in which like reference numerals indicate like parts, Fig. 1 is a side elevation of a reamer;

Figures 1, 2:
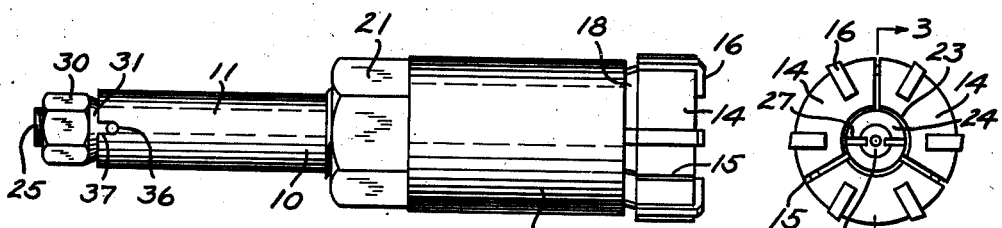
Fig. 2 is a front end elevation of the reamer.
Figures 3, 4:
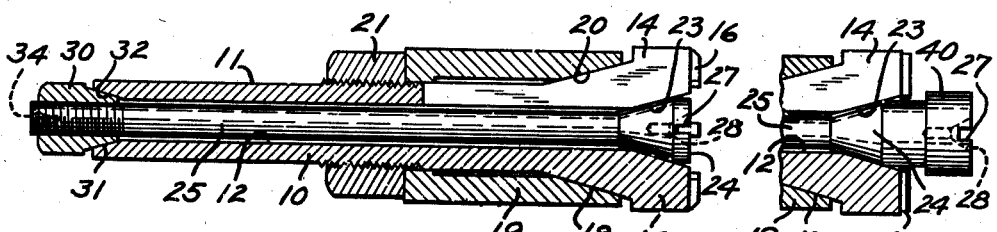
Fig. 3 is a section on the line 3—3 of Fig. 2.
Fig. 4 is a fragmentary view similar to Fig. 3, showing the invention applied to a counterbore.

The reamer shown in Figs. 1 to 3 inclusive comprises an elongated main body 10 having a cylindrical rear portion 11 adapted to serve as a shank for the support of the device. It will be understood that this shank may be gripped by a chuck or similar mechanism whereby the reamer may be rotated about its axis and advanced forwardly into a hole in a work piece, or the reamer may be held stationary while the work piece is rotated about the same. A central bore 12 extends rearwardly into the body 10 and preferably through the entire length thereof. The front portion of the body 10 is divided into three identical sectors or fingers 14 by means of three equally spaced radial slots 15 which communicate with the bore 12, these slots extending from the front end of the body rearwardly for a substantial distance. Suitable cutting blades 16 are provided on the front portion of the fingers 14. These blades may be integral with the fingers or formed of separate pieces rigidly secured to the fingers in any suitable manner, as by welding, brazing, soldering or the like. As shown in Fig. 2, there are two of the blades 16 on each finger, but in the case of small diameter reamers I may provide only one blade on each finger. The body 10 is constructed of steel or other suitable material providing the necessary strength and elasticity.

It will now be apparent that the rear ends of the fingers 14 are integrally connected to the shank 11 and their front ends are overhung. By moving these front ends inwardly or outwardly in radial directions, it is possible to vary the effective diameter of the reamer. Such movements are possible because of the elasticity of the material from which the body 10 is formed.

In order that the position of the blades 16 may be controlled in radial directions, the fingers 14 are provided with a rearwardly tapering or converging conical external surface 18 located immediately in the rear of the blades. Also, the fingers are surrounded by a sleeve 19 having a rearwardly tapering or converging conical internal surface 20 adjacent its front end for engagement with the surface 18. The rear end of the sleeve 19 engages a nut 21 which is screw-threaded on the front portion of the shank 11. The front end of the bore 12 is enlarged to provide a rearwardly tapering conical recess 23 for the reception of a similarly shaped conical plug 24 forming the head of a bolt or screw 25. This plug is provided with a screw-driver slot 27 and with a countersunk central recess 28. The bolt 25 extends through the bore 12 and is provided with screw threads on its rear end to receive a nut 30, this nut having a forwardly converging conical surface 31 which engages a similarly shaped recess 32 in the rear end of the shank 11, as shown in Fig. 3. The bolt 25 is provided with a countersunk central recess 34 (Fig. 3) at its rear end. A pin 36 (Fig. 1) extends radially from the nut 30 into a slot 37 in the shank 11 to prevent rotation of the nut.

It will now be apparent that to adjust the size of the reamer the operator will first loosen the nut 21 and then turn the bolt head 24 in the proper direction. As the bolt head is turned it will be moved axially because of the threaded connection between the rear end of the bolt 25 and the nut 30. This axial movement of the conical bolt head will expand the fingers 14 or allow them to contract (depending upon the direction of movement). When the parts have been adjusted sufficiently, the operator will tighten the nut 21. This will force the sleeve 19 forwardly to bring the surface 20 into firm contact with the tapering surface 18 of each finger 14, and the fingers will be held tightly against the conical bolt head 24. The resilience of the fingers 14 will enable them to bend outwardly or inwardly a sufficient amount to allow a substantial range of adjustment. This adjustment can be made very quickly and easily without removing the shank 11 from the supporting chuck, since access to the nut 30 is unnecessary. When regrinding of the blades 16 is required, the reamer can be supported on the usual conical centers of the grinding machine, these centers entering the recesses 28 and 34.

The invention is applicable to the construction of counterbores, as shown in Fig. 4. In this figure the bolt head 24 is provided with a forwardly extending cylindrical projection 40 which is adapted to serve as a pilot when the tool is in use. Also, blades 41 particularly adapted for counterboring are provided on the front ends of the fingers 14.

Figures 5, 6:
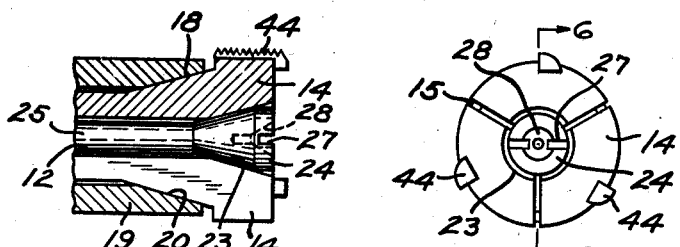
Fig. 5 is a front end elevation of a tap.
Fig. 6 is a fragmentary view in section on the line 6—6 of Fig. 5.

The invention is also applicable to the construction of thread-cutting tools, such as taps, as shown in Figs. 5 and 6. In these figures each finger 14 is provided with a serrated blade 44 of the proper shape to cut screw threads in a previously drilled hole. The diameter of the tap can be adjusted in the same manner as the reamer.

In each form of the invention illustrated, the cutting blades are very rigidly supported, and yet they can be adjusted quickly and simply. Furthermore, the device is comparatively simple and inexpensive to manufacture. Since the outer radius of the sleeve 19 is less than that of the cutting blades, the entire tool may enter the opening formed by the blades, as is often desirable.

Having thus described my invention, what I claim as new and desire to secure by Letters Patent is:

1. A cutting tool comprising an elongated body having a central bore in its forward portion, slots communicating with the bore and extending rearwardly from the front end of the body to divide the front portion thereof into a plurality of forwardly projecting fingers, a cutting blade projecting outwardly from each finger near the front end thereof, axially adjustable means within the front portion of the bore to limit inward flexing of the fingers, and axially adjustable annular means surrounding the fingers rearwardly of the blades to limit outward flexing of the fingers, the outer radius of the said annular means being less than that of the cutting blades.

2. A cutting tool comprising an elongated body having a central bore in its forward portion provided adjacent its front end with a rearwardly tapering recess, slots communicating with the bore and extending rearwardly from the front end of the body to divide the front portion thereof into a plurality of forwardly projecting fingers, a cutting blade projecting outwardly from each finger near the front end thereof, an axially adjustable rearwardly tapering plug located within the recess to limit inward flexing of the fingers, and axially adjustable annular means surrounding the fingers rearwardly of the blades to limit outward flexing of the fingers.

3. A cutting tool comprising an elongated body having a central bore in its forward portion, slots communicating with the bore and extending rearwardly from the front end of the body to divide the front portion thereof into a plurality of forwardly projecting fingers, a cutting blade projecting outwardly from each finger near the front end thereof, the fingers having rearwardly tapering external surfaces in the rear of the blades, an axially adjustable sleeve surrounding the fingers and provided at its front end with a rearwardly tapering internal surface which engages the tapering surfaces of the fingers to limit outward flexing of the fingers, and axially adjustable means within the front portion of the bore to limit inward flexing of the fingers.

4. A cutting tool comprising an elongated body having a central bore in its forward portion provided adjacent its front end with a rearwardly tapering recess, slots communicating with the bore and extending rearwardly from the front end of the body to divide the front portion thereof into a plurality of forwardly projecting fingers, a cutting blade projecting outwardly from each finger near the front end thereof, the fingers having rearwardly tapering external surfaces in the rear of the blades, an axially adjustable rearwardly tapering plug located within the recess to limit inward flexing of the fingers, and an axially adjustable sleeve surrounding the fingers and provided at its front end with a rearwardly tapering internal surface which engages the tapering surfaces of the fingers to limit outward flexing of the fingers.

5. A cutting tool comprising an elongated body having a central bore in its forward portion provided adjacent its front end with a rearwardly tapering recess, slots communicating with the bore and extending rearwardly from the front end of the body to divide the front portion thereof into a plurality of forwardly projecting fingers, a cutting blade projecting outwardly from each finger near the front end thereof, the fingers having rearwardly tapering external surfaces in the rear of the blades, an axially adjustable rearwardly tapering plug located within the recess to limit inward flexing of the fingers, and a sleeve surrounding the fingers in the rear of the blades and having an outer radius less than that of the blades, the sleeve being axially adjustable independently of the plug and having at its front end a rearwardly tapering internal surface which engages the tapering surfaces of the fingers to limit outward flexing of the fingers.

6. A cutting tool comprising an elongated body having a central bore extending longitudinally through the same, the bore having a rearwardly tapering recess adjacent its front end, slots communicating with the bore and extending rearwardly from the front end of the body to divide the front portion thereof into a plurality of forwardly projecting fingers, a cutting blade on each finger near the front end thereof, the fingers having rearwardly tapering external surfaces in the rear of the blades, a bolt extending through the bore and provided at its front end with a rearwardly tapering head which is located within the recess to limit inward flexing of the fingers, a nut screw-threaded to the rear end of the bolt, a sleeve surrounding the fingers and provided at its front end with a rearwardly tapering internal surface which engages the tapering surfaces of the fingers to limit outward flexing of the fingers, and a nut screw-threaded to the body in the rear of the sleeve to adjust the sleeve axially.

7. A cutting tool comprising an elongated body having a central bore extending longitudinally through the same, the bore having a rearwardly tapering recess adjacent its front end, slots communicating with the bore and extending rearwardly from the front end of the body to divide the front portion thereof into a plurality of forwardly projecting fingers, a cutting blade on each finger near the front end thereof, a bolt extending through the bore and provided at its front end with a rearwardly tapering head which is located within the recess to engage the inner surfaces of the fingers, a nut screw-threaded to the rear end of the bolt and engaging the rear end of the body, and means to prevent rotation of the nut, whereby the bolt head may be adjusted axially by rotating it relative to the body.

FREDERICK M. RAMSDELL.